(12) United States Patent     (10) Patent No.:   US 12,637,082 B2

Manawadu et al.     (45) Date of Patent:    May 26, 2026

(54) VEHICLE CONTROL DEVICE, STORAGE MEDIUM STORING COMPUTER PROGRAM FOR VEHICLE CONTROL, AND METHOD FOR CONTROLLING VEHICLE

(71) Applicants: TOYOTA JIDOSHA KABUSHIKI KAISHA, Toyota (JP); AISIN CORPORATION, Kariya (JP)

(72) Inventors: Udara Eshan Manawadu, Edogawa-ku (JP); Takuhiro Omi, Anjo (JP); Hiroshi Morimoto, Ota-ku (JP); Kenta Yamada, Shinagawa-ku (JP)

(73) Assignees: TOYOTA JIDOSHA KABUSHIKI KAISHA, Toyota (JP); AISIN CORPORATION, Kariya (JP)

( * ) Notice: Subject to any disclaimer, the term of this patent is extended or adjusted under 35 U.S.C. 154(b) by 62 days.

(21) Appl. No.: 18/599,462

(22) Filed: Mar. 8, 2024

(65) Prior Publication Data

US 2024/0336267 A1     Oct. 10, 2024

(30) Foreign Application Priority Data

Apr. 6, 2023    (JP) ................................. 2023-062213

(51) Int. Cl.
   *B60W 30/182*      (2020.01)
   *B60W 50/10*      (2012.01)

(52) U.S. Cl.
   CPC .......... *B60W 30/182* (2013.01); *B60W 50/10* (2013.01)

(58) Field of Classification Search
   CPC . B60W 60/0013; B60W 30/182; B60W 40/08
   See application file for complete search history.

(56) References Cited

U.S. PATENT DOCUMENTS

| | | | |
|---|---|---|---|
| 11,834,067 B1 * | 12/2023 | Hutchings | G06F 18/214 |
| 2018/0134116 A1 * | 5/2018 | Chen | B60H 1/00742 |
| 2018/0208209 A1 * | 7/2018 | Al-Dahle | B60W 10/22 |
| 2020/0104966 A1 * | 4/2020 | Cella | G06Q 50/188 |
| 2020/0406906 A1 * | 12/2020 | Omari | G05D 1/0223 |
| 2021/0039662 A1 * | 2/2021 | Stayton | B60W 30/025 |
| 2021/0061298 A1 * | 3/2021 | Balachandran | A61B 5/14551 |
| 2021/0107500 A1 * | 4/2021 | Kalabic | B60W 50/14 |
| 2021/0372807 A1 * | 12/2021 | Andou | G01C 21/3484 |
| 2022/0153300 A1 * | 5/2022 | Kwatra | G01C 21/3484 |
| 2022/0194415 A1 * | 6/2022 | Liu | G06F 16/9038 |
| 2023/0098178 A1 * | 3/2023 | Stenneth | G01C 21/26 701/533 |
| 2023/0192099 A1 * | 6/2023 | Rusciano | B60W 60/001 701/25 |

FOREIGN PATENT DOCUMENTS

| | | |
|---|---|---|
| JP | 2008-120271 A | 5/2008 |
| JP | 2019-127238 A | 8/2019 |
| JP | 2019-172137 A | 10/2019 |

* cited by examiner

*Primary Examiner* — Long T Tran

(74) *Attorney, Agent, or Firm* — Dickinson Wright, PLLC

(57) ABSTRACT

A vehicle control device for a vehicle in which driving is automatically controlled in a predetermined driving mode established by automatic control parameters. The vehicle control device has a processor configured to acquire a response from a driver in regard to driving of the vehicle, as a numerical value, when driving of the vehicle by automatic control has ended, and to change the automatic control parameters based on the numerical value of the response from the driver.

8 Claims, 6 Drawing Sheets

FIG. 3

| | LONGITUDINAL ACCELERATION | LATERAL ACCELERATION | AUTOMATIC CONTROL PARAMETERS | AIR-CONDITIONING | SCORE |
|---|---|---|---|---|---|
| 101 | 102 | 103 | 104 DAMPING | 105 | 106 |
| MODE 1 | HIGH | HIGH | LARGE | COMFORT | 1 |
| MODE 2 | LOW | LOW | SMALL | COMFORT | 2 |
| MODE 3 | NORMAL | NORMAL | NORMAL | COMFORT | 3 |
| MODE 4 | HIGH | NORMAL | SMALL | COMFORT | 4 |
| MODE 5 | HIGH | HIGH | LARGE | ECO | 1 |
| MODE 6 | LOW | LOW | SMALL | ECO | 2 |
| MODE 7 | NORMAL | NORMAL | NORMAL | ECO | 3 |
| MODE 8 | HIGH | NORMAL | SMALL | ECO | 4 |
| ⋮ | ⋮ | ⋮ | ⋮ | ⋮ | ⋮ |

| | LONGITUDINAL ACCELERATION 201 | 202 | LATERAL ACCELERATION 203 DAMPING | ROAD SURFACE 204 205 | TRAFFIC 206 | ROAD 207 |
|---|---|---|---|---|---|---|
| MODE 9 | HIGH | LOW | LARGE | DRY | CONGESTED | HIGH-SPEED ROAD |
| MODE 10 | NORMAL | NORMAL | NORMAL | DRY | CONGESTED | HIGH-SPEED ROAD |
| MODE 11 | LOW | LOW | SMALL | DRY | CONGESTED | HIGH-SPEED ROAD |
| MODE 12 | HIGH | LOW | LARGE | DRY | NOT CONGESTED | HIGH-SPEED ROAD |
| MODE 13 | NORMAL | NORMAL | NORMAL | DRY | NOT CONGESTED | HIGH-SPEED ROAD |
| MODE 14 | LOW | LOW | SMALL | DRY | NOT CONGESTED | HIGH-SPEED ROAD |
| ⋮ | ⋮ | ⋮ | ⋮ | ⋮ | ⋮ | ⋮ |

AUTOMATIC CONTROL PARAMETERS 200

ENVIRONMENT PARAMETERS

FIG. 6

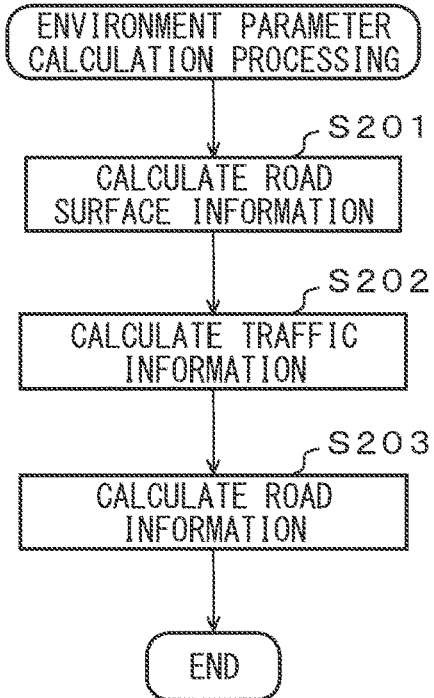

ENVIRONMENT PARAMETER CALCULATION PROCESSING

S201 CALCULATE ROAD SURFACE INFORMATION

S202 CALCULATE TRAFFIC INFORMATION

S203 CALCULATE ROAD INFORMATION

END

FIG. 7

AUTOMATIC CONTROL PARAMETERS            DRIVER PARAMETERS

|  | LONGITUDINAL ACCELERATION 301 | 302 300 | LATERAL ACCELERATION 303 DAMPING 304 | ALERTNESS LEVEL 305 | FACIAL EXPRESSION 306 |
|---|---|---|---|---|---|
| MODE 15 | HIGH | LOW | LARGE | HIGH | COMFORTABLE |
| MODE 16 | NORMAL | NORMAL | NORMAL | HIGH | COMFORTABLE |
| MODE 17 | LOW | LOW | SMALL | HIGH | COMFORTABLE |
| MODE 18 | HIGH | LOW | LARGE | HIGH | |
| MODE 19 | NORMAL | NORMAL | NORMAL | HIGH | |
| MODE 20 | LOW | LOW | SMALL | HIGH | |
| ⋮ | ⋮ | ⋮ | ⋮ | ⋮ | ⋮ |

UNCOMFORTABLE

FIG. 8

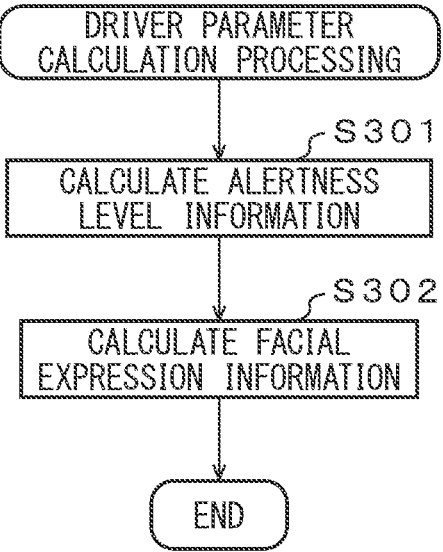

DRIVER PARAMETER CALCULATION PROCESSING

S301 CALCULATE ALERTNESS LEVEL INFORMATION

S302 CALCULATE FACIAL EXPRESSION INFORMATION

END

VEHICLE CONTROL DEVICE, STORAGE MEDIUM STORING COMPUTER PROGRAM FOR VEHICLE CONTROL, AND METHOD FOR CONTROLLING VEHICLE

FIELD

The present disclosure relates to a vehicle control device, a storage medium storing a computer program for vehicle control, and a method for controlling a vehicle.

BACKGROUND

In the prior art, a driver selects a preferred driving mode such as eco-mode, comfort mode or sports mode for manual driving of the vehicle, when the vehicle is to be driven by manual control. The vehicle has different acceleration performance, braking performance or suspension performance depending on the selected driving mode.

In a self-driving vehicle, on the other hand, the driver does not drive while the vehicle is traveling by self-driving, but may still have personal preferences for driving of the vehicle in which they are riding. For example, some drivers may prefer to concentrate on something of interest while riding in a self-driving vehicle. Such drivers may prefer driving in a more smooth, relaxing manner.

Japanese Unexamined Patent Publication No. 2019-127238, for example, proposes a vehicle control device that determines the physical condition of a passenger based on detection information for the passenger state, queries the passenger to confirm the physical condition of the passenger, and carries out automatic operation control according to whether or not the physical condition determination results match the physical condition confirmation results. The vehicle control device restricts the upper limits for acceleration, deceleration and speed of the vehicle depending on the determination results, to cause the vehicle to travel more smoothly in order to help the passenger recover from a poor physical condition.

SUMMARY

Due to differing preferences of individual drivers for driving, different drivers are expected to have different preferred driving modes for driving of a vehicle by automatic control. However, no technique has yet been proposed for driving a vehicle by automatic control in driving modes that satisfy the preferences of different drivers.

It is therefore an object of the present disclosure to provide a vehicle control device that allows a vehicle to be driven by automatic control in a driving mode set according to an individual driver preference.

(1) One embodiment of the invention provides a vehicle control device. The vehicle control device is a vehicle control device for a vehicle whereby driving of the vehicle is automatically controlled in a predetermined driving mode established by automatic control parameters, the vehicle control device has a processor configured to acquire a response from a driver in regard to driving of the vehicle, as a numerical value, when driving of the vehicle by automatic control has ended, and change the automatic control parameters based on the numerical value of the response from the driver.

(2) In the vehicle control device of embodiment (1) above, it is preferable that the processor be further configured to acquire the response from the driver as the numerical value for the level of relaxation in regard to driving of the vehicle.

(3) In the vehicle control device of embodiment (1) or (2) above, it is preferable that the automatic control parameters include information for controlling acceleration in the longitudinal direction, acceleration in the lateral direction or damping of vibration.

(4) In the vehicle control device of any one of embodiments (1) to (3) above, it is preferable that the processor be further configured to change the automatic control parameters based on the numerical value of the response from the driver, and on information relating to surrounding environment of the vehicle.

(5) In the vehicle control device of any one of embodiments (1) to (3) above, it is preferable that the processor be further configured to change the automatic control parameters based on the numerical value of the response from the driver, and on information relating to a state of the driver.

(6) According to another embodiment, a computer program for vehicle control is provided. The computer program for vehicle control is a computer program for vehicle control in a vehicle in which driving is automatically controlled in a predetermined driving mode established by automatic control parameters, which causes a processor to execute a process that includes acquiring a response from a driver in regard to driving of the vehicle, as a numerical value, when driving of the vehicle by automatic control has ended, and changing the automatic control parameters based on the numerical value of the response from the driver.

(7) Yet another embodiment of the invention provides a method for controlling a vehicle that is carried out by a vehicle control device. The method for controlling a vehicle is a method for controlling a vehicle in which driving is automatically controlled in a predetermined driving mode established by automatic control parameters, and includes acquiring a response from a driver in regard to driving of the vehicle, as a numerical value, when driving of the vehicle by automatic control has ended, and changing the automatic control parameters based on the numerical value of the response from the driver.

The vehicle control device of the present disclosure allows a vehicle to be driven by automatic control in a driving mode set according to an individual driver preference.

The object and advantages of the invention will be realized and attained by means of the elements and combinations particularly indicated in the claims. It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of a driving mode management table for the vehicle control device of the embodiment.

FIG. 5 is a diagram illustrating an example of a driving mode management table for the vehicle control device of Modified Example 1.

FIG. 6 is an example of an operation flow chart for environment parameter calculation processing by the vehicle control device of Modified Example 1.

FIG. 7 is a diagram illustrating an example of a driving mode management table for the vehicle control device of Modified Example 2.

FIG. 8 is an example of an operation flow chart for driver parameter calculation processing by the vehicle control device of Modified Example 2.

DESCRIPTION OF EMBODIMENTS

Figure 1:
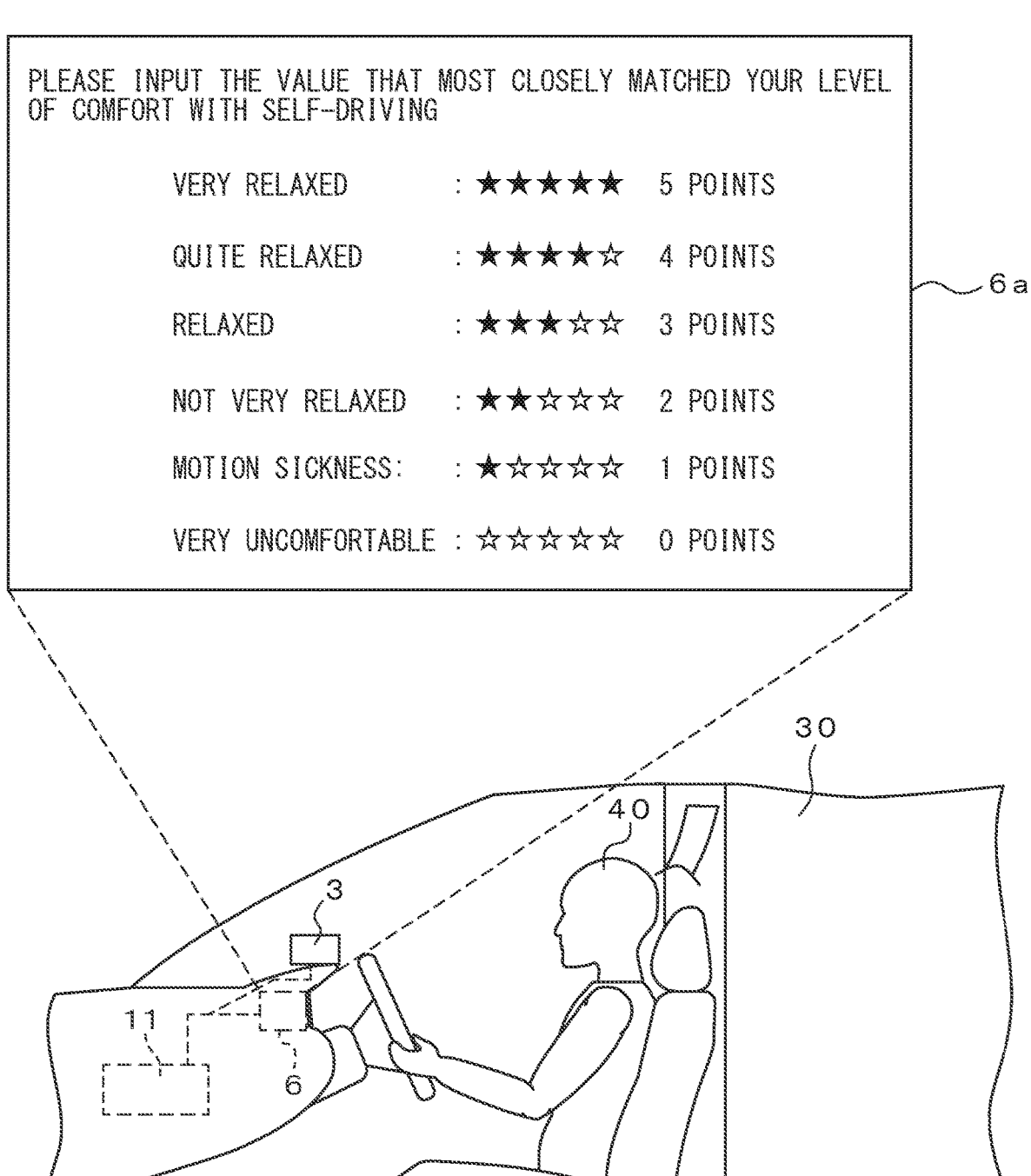
FIG. 1 is a diagram illustrating operation of a vehicle control device of the embodiment in overview.

FIG. 1 is a diagram illustrating operation of the vehicle control device 11 of the embodiment in overview. Operation of the vehicle control device 11 of this embodiment will now be explained in overview with reference to FIG. 1.

As shown in FIG. 1, the vehicle 10 has a vehicle control device 11. The vehicle control device 11 has an automatic control mode in which the vehicle 10 is driven primarily by the vehicle control device 11, and a manual control mode in which the vehicle 10 is driven primarily by the driver 40. In manual control mode, the vehicle control device 11 controls operation of the vehicle 10 based on manipulation by the driver 40 in the vehicle cabin 30. The vehicle 10 may also be a self-driving vehicle.

In automatic control mode, the vehicle control device 11 automatically controls the vehicle 10 in a predetermined driving mode established by automatic control parameters. The automatic control parameters include information for control acceleration, braking or damping of vibration, for example. The driving mode is selected according to a previous driver preference.

When operation in automatic control mode is ended, the vehicle control device 11 acquires a response from the driver 40 in regard to driving of the vehicle 10, via a user interface (UI) 6. The vehicle control device 11 displays questions for the driver in regard to driving of the vehicle, on a display device 6a of the UI 6.

In the example shown in FIG. 1, the display device 6a of the UI 6 displays the text: "Please input the value that most closely matched your level of comfort with self-driving". The display device 6a displays that a level of 5 is to be input for "very relaxed", a level of 4 is to be input for "quite relaxed", a level of 3 is to be input for "relaxed", a level of 2 is to be input for "not very relaxed", a level of 1 is to be input for "motion sickness", and a level of 0 is to be input for "very uncomfortable".

The driver 40 operates the UI 6 to input a numerical value as the driver 40 response in regard to driving of the vehicle 10. For example, a driver 40 that has perceived a high acceleration and high braking level may select a level of 1. A driver may input a level of 2 if they have perceived a low level of acceleration of the vehicle 10 and have felt that a long time was required for the vehicle 10 to reach the destination location.

The vehicle control device 11 changes automatic control parameters based on the numerical value of the response from the driver 40. For example, when a response level of 1 has been input, the vehicle control device 11 may change the automatic control parameters so as to lower the level of acceleration and braking. When a response level of 2 has been input, the vehicle control device 11 may change the automatic control parameters so as to increase the level of acceleration.

In the next automatic control mode, the vehicle control device 11 automatically controls driving of the vehicle 10 in a driving mode established by automatic control parameters.

As explained above, in the vehicle control device 11 of this embodiment automatic control parameters for driving of the vehicle 10 are changed based on a response from the driver 40 in regard to self-driving of the vehicle 10, represented as a numerical value. Since driving of the vehicle 10 is automatically controlled based on the driving mode decided by the changed automatic control parameters, the vehicle control device 11 allows driving of the vehicle 10 to be carried out in a driving mode matching each individual driver preference.

Figure 2:
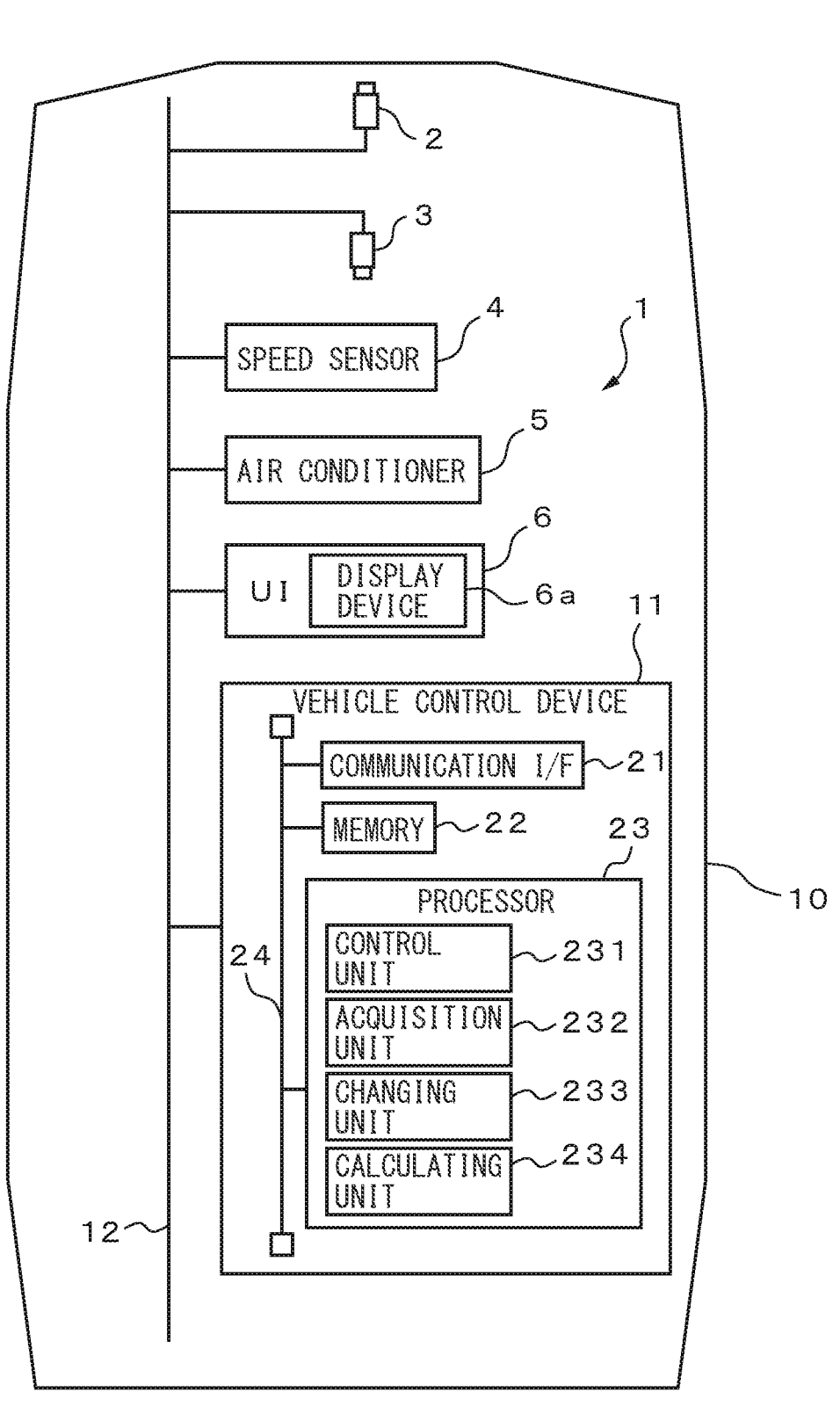
FIG. 2 is a general schematic drawing of a vehicle in which the vehicle control device of the embodiment is mounted.

FIG. 2 is a general schematic drawing of a vehicle 10 in which a vehicle control system 1 is mounted that comprises a vehicle control device 11 of the embodiment. The vehicle 10 has a front camera 2, a monitoring camera 3, a speed sensor 4, an air conditioner 5, a user interface (UI) 6 and a vehicle control device 11. The vehicle control system 1 has at least a vehicle control device 11.

The front camera 2, monitoring camera 3, speed sensor 4, air conditioner 5, UI 6 and vehicle control device 11 are connected in a communicable manner via an in-vehicle network 12 conforming to the Controller Area Network standard.

The front camera 2 is an example of an imaging unit provided in the vehicle 10. The front camera 2 is mounted on the vehicle 10 and directed toward the front of the vehicle 10. The front camera 2, for example, takes a front image in which the situation in a predetermined region ahead of the vehicle 10 is shown, at a predetermined cycle. The front image can show the road in the predetermined region ahead of the vehicle 10, and road features such as surface lane marking lines on the road. The front camera 2 has a 2D detector composed of an array of photoelectric conversion elements with visible light sensitivity, such as a CCD or C-MOS, and an imaging optical system that forms an image of the photographed region on the 2D detector.

Each time a front image is taken, the front camera 2 outputs the front image and front camera imaging time at which the front image was taken, to the vehicle control device 11 via the in-vehicle network 12. At the vehicle control device 11, the front image is used for processing to estimate the location of the vehicle 10, as well as for processing to detect objects around the vehicle 10 and processing to estimate the environment around the vehicle 10.

The monitoring camera 3 is disposed in the vehicle cabin 30 in a manner allowing it to photograph facial images including the face of the driver 40 driving the vehicle 10. The monitoring camera 3 is an example of an imaging unit. The monitoring camera 3 photographs a facial image representing the conditions including the driving seat at a facial imaging time at a predetermined cycle. The monitoring camera 3 has a 2D detector composed of an array of photoelectric conversion elements with infrared sensitivity, such as a CCD or C-MOS, and an imaging optical system that forms an image of the photographed region on the 2D detector. The facial image is used for processing by the vehicle control device 11 to estimate the state of the driver 40.

The speed sensor 4 detects speed information representing the speed of the vehicle 10. The speed sensor 4 has a measuring device that measures the rotational speed of the tires of the vehicle 10. The speed sensor 4 outputs the speed information to the vehicle control device 11 via the in-vehicle network 12. The speed information is used for processing by the vehicle control device 11 to calculate the speed of the vehicle 10.

The air conditioner 5 is controlled by the vehicle control device 11 to control the temperature and humidity in the vehicle cabin 30. The air conditioner 5 is also controlled by the vehicle control device 11 to control the airflow rate. In automatic control mode, the air conditioner 5 is controlled by air conditioning control information among the automatic control parameters.

The UI 5 is an example of the notification unit. The UI 5, controlled by the vehicle control device 11, notifies the driver 40 of operating information relating to the vehicle 10. The operating information relating to the vehicle 10 includes traveling information for the vehicle 10 and questions to the driver regarding driving of the vehicle 10. The UI 5 has a display device 5a such as a liquid crystal display or touch panel, for display of the operating information. The UI 5 may also have an acoustic output device (not shown) to notify the driver 40 of operating information. The UI 5 also creates an operation signal in response to operation of the vehicle 10 by the driver 40. The operation information may be, for example, a destination location, transit points, vehicle speed, or a request for transfer of driving mode. The operation information includes the response from the driver in regard to driving of the vehicle 10. The UI 5 also has a touch panel or operating button, for example, as an input device for inputting operation information from the driver 40 to the vehicle 10. The UI 5 outputs the input operation information to the vehicle control device 11 via the in-vehicle network 12.

The vehicle control device 11 carries out control processing, acquisition processing, change processing and calculation processing. For this purpose, the vehicle control device 11 has a communication interface (IF) 21, a memory 22 and a processor 23. The communication IF 21, the memory 22 and the processor 23 are connected via a signal wire 24. The communication IF 21 has an interface circuit to connect the vehicle control device 11 with the in-vehicle network 12.

The memory 22 is an example of a memory unit, and it has a volatile semiconductor memory and a non-volatile semiconductor memory, for example. The memory 22 stores an application computer program and various data to be used for information processing carried out by the processor 23 of each device. The memory 22 also stores map information. The map information preferably has high-precision map information including three-dimensional information for the road surface, information for the types and locations of structures and road features such as road lane marking lines, and the legal speed limit for the road. The map information also includes the types of roads. The types of roads may be high-speed roads (motorways), general roads and mountain roads.

The memory 22 stores driving mode management information relating the driving modes and automatic control parameters. FIG. 3 is a diagram illustrating an example of a driving mode management table for a vehicle control device of the embodiment. The driving mode management table 100 is an example of driving mode management information.

In the driving mode management table 100, the driving modes for self-driving and the automatic control parameters are registered in an associated manner. Control of acceleration, vibration damping and air conditioning of the vehicle 10 for self-driving is decided by the automatic control parameters for control of each operation. Each driving mode has different methods of control of acceleration, vibration damping and air conditioning, according to the automatic control parameters. For this embodiment, each driving mode is selected to match the preference of the driver 40.

In the example of the driving mode management table 100 shown in FIG. 3, the automatic control parameters include longitudinal acceleration control information representing information for control of acceleration in the longitudinal direction, lateral acceleration control information representing information for control of acceleration in the lateral direction, damping control information representing information for control of vibration damping in the suspension, and air conditioning control information representing information for control of the air conditioner. Acceleration in the longitudinal direction represents acceleration in the traveling direction of the vehicle 10. Acceleration in the lateral direction represents acceleration in the traveling direction perpendicular to the traveling direction of the vehicle 10. The automatic control parameters shown in FIG. 3 are only exemplary. The automatic control parameters may also include information for control of steering or information for control of braking.

The driving mode management table 100 has a mode column 101 in which driving modes for self-driving are registered, a longitudinal acceleration column 102 in which longitudinal acceleration control information is registered, a lateral acceleration column 103 in which lateral acceleration control information is registered, a damping column 104 in which damping control information is registered, and an air conditioning information column 105 in which air conditioning control information is registered. One driving mode is determined by a combination of the different automatic control parameters (longitudinal acceleration control information, lateral acceleration control information, damping control information and air conditioning control information). The information for the different combinations of automatic control parameters differ between the different driving modes.

The driving mode management table 100 may also have a score column 106. In the score column 106, score information representing the level of relaxation of the driver is registered within the group of modes having the same air conditioning control information among the automatic control parameters. Among the group of modes with "comfort" for air conditioning control information, the level of relaxation of the driver is higher in order from driving mode 1 to driving mode 4. Among the group of modes with "eco" for air conditioning control information, the level of relaxation of the driver is higher in order from driving mode 5 to driving mode 8.

The memory 22 stores driver management information (not shown) in which driver identification information for identification of the driver 40 is registered in association with the driving mode selected for the driver 40 for self-driving. The driver management information also includes facial feature information representing the face of the driver 40, registered in association with the driver identification information.

All or some of the functions of the vehicle control device 11 are functional modules driven by a computer program operating on the processor 23, for example. The processor 23 has a control unit 231, an acquisition unit 232, a changing unit 233 and a calculating unit 234. Alternatively, the functional module of the processor 23 may be a specialized computing circuit in the processor 23. The processor 23 comprises one or more CPUs (Central Processing Units) and their peripheral circuits. The processor 23 may also have other computing circuits such as a logical operation unit, numerical calculation unit or graphics processing unit.

The control unit 231 controls operation including traveling of the vehicle 10. The control unit 231 has two control modes with different degrees of participation of the driver 40 in driving. The control unit 231 controls operation of the vehicle 10 according to the control mode.

For example, the control unit 231 has an automatic control mode in which the degree to which the driver 40 participates in driving is low (for example, driving mode with levels 3 to 5) and a manual control mode in which the degree to which the driver 40 participates in driving is high (for example, driving mode with levels 0 to 2). In automatic control mode, the vehicle 10 is driven primarily by the control unit 231. In manual control mode, the vehicle 10 is driven primarily by the driver 40.

In automatic control mode in which the degree to which the driver 40 participates in driving is low, all or some of the driving operations necessary for traveling of the vehicle 10 are executed automatically, while in manual control mode in which the degree to which the driver 40 participates in driving is high, the types of driving operations executed automatically are fewer than in the driving mode in which the degree to which the driver 40 participates in driving is low, or are zero.

In automatic control mode, the control unit 231 generates a driving plan to control actions such as steering, driving, braking and damping of vibration based on map information and on detection information from sensors, such as the front camera 2, mounted in the vehicle 10. The control unit 231 outputs the automatic control signal based on the driving plan, to an actuator (not shown) that controls the steering wheel, a drive unit (not shown), a brake (not shown) or a suspension (not shown), via the in-vehicle network 12. The control unit 231 also controls the air conditioner 5 based on the air conditioning control information selected according to the automatic control parameters.

In automatic control mode, the control unit 231 controls operation of the vehicle 10 based on the automatic control parameters associated with the selected driving mode (see FIG. 3). The longitudinal acceleration control information represents the degree of change in acceleration and deceleration in the longitudinal direction during control. The degree of change in acceleration and deceleration in the longitudinal direction increases in the order: low, normal, high. The lateral acceleration control information represents the degree of change in acceleration in the lateral direction during control. The degree of change in acceleration in the lateral direction increases in the order: low, normal, high. The damping control information represents the degree of change in damping during control. The degree of change in damping increases in the order: small, normal, large. The air conditioning control information represents the degree of strength of air conditioning during control. The degree of strength of air conditioning increases in the order: eco, comfort.

In manual control mode, the control unit 231 generates a manual control signal to control operation of the vehicle 10 such as steering, driving and braking based on operation by the driver 40, and outputs the manual control signal to an actuator for actuation of the steering wheel, and to a drive unit or brake, via the in-vehicle network 12.

In manual control mode as well, the control unit 231 provides the driving modes of eco-mode, comfort mode and sports mode to be selected by the driver. The control unit 231 controls operation of the vehicle 10 in the driving mode selected by the driver.

The control unit 231 can drive the vehicle 10 in automatic control mode in regions where automatic control mode is permitted (for example, regions where a high-precision map has been prepared for control of the vehicle 10). In regions where automatic control mode is not permitted, the control unit 231 controls the vehicle 10 in manual control mode. In response to a request by the driver 40, the control unit 231 switches from automatic control mode to manual control mode or from manual control mode to automatic control mode. The control unit 231 also switches from automatic control mode to manual control mode when it has determined that the vehicle 10 cannot be safely driven in automatic control mode.

The vehicle control device 11 is an electronic control unit (ECU), for example. In FIG. 2, the control unit 231, acquisition unit 232, changing unit 233 and calculating unit 234 were described as being in the same device, but the acquisition unit 232, changing unit 233 and calculating unit 234 may also be provided as separate devices from the control unit 231.

Figure 4:
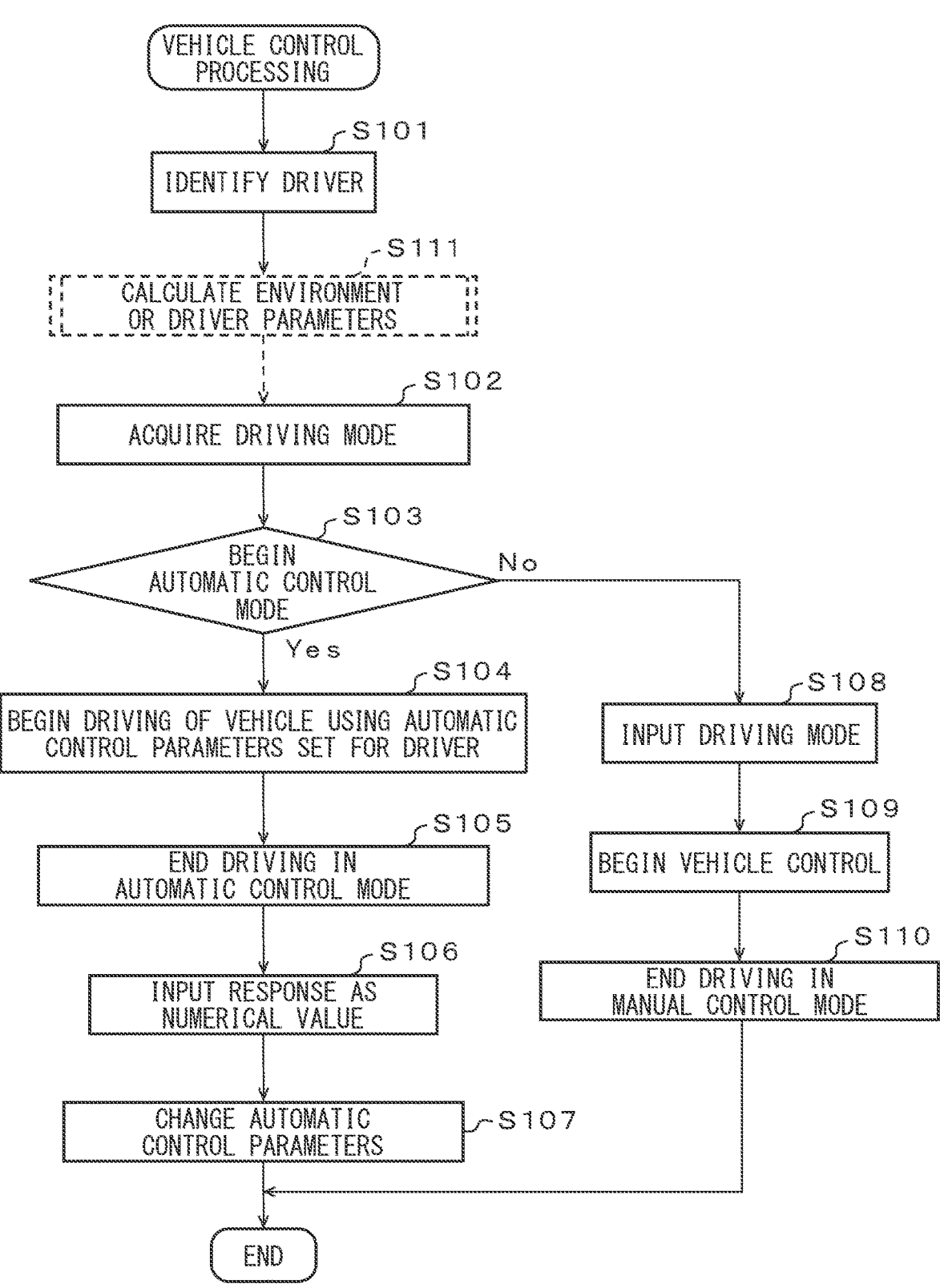
FIG. 4 is an example of an operation flow chart for vehicle control processing by the vehicle control device of the embodiment.

FIG. 4 is an example of an operation flow chart for vehicle control processing by the vehicle control device 11 of the embodiment. Vehicle control processing by the vehicle control device 11 will be described below with reference to FIG. 4. When the vehicle control device 11 starts up, the vehicle control device 11 carries out vehicle control processing according to the operation flow chart shown in FIG. 4.

The control unit 231 first identifies the driver 40 (step S101). For example, based on a facial image taken by the monitoring camera 3, the control unit 231 identifies the driver 40 represented in the facial image. The control unit 231 has a classifier that classifies feature information for the face of the driver 40 based on facial images. The control unit 231 acquires facial feature information by inputting facial images into the classifier. The control unit 231 refers to driver management information stored in the memory 22 to acquire driver identification information associated with the facial feature information. The control unit 231 identifies the driver 40 by the driver identification information. The method of identifying the driver 40 is not particularly restricted. For example, the method of identifying the driver may utilize other methods such as fingerprint authentication, vein authentication or iris authentication.

The control unit 231 then refers to the driver management information stored in the memory 22, and acquires the driving mode associated with the driver identification information whereby the driver 40 was identified, for self-driving (step S102). The driving mode is determined by automatic control parameters changed based on response from the driver 40 when prior driving of the vehicle 10 in automatic control mode has ended. When the driver 40 is driving the vehicle 10 for the first time, the default driving mode is selected.

The control unit 231 then queries the driver 40 via the UI 6, whether or not to initiate driving in automatic control mode (step S103). By operating the UI 6, the driver 40 responds whether or not initiation of driving in automatic control mode is approved.

When driving in automatic control mode is to be initiated (step S103—Yes), the control unit 231 initiates self-driving in the driving mode associated with the driver identification information of the driver 40, for automatic control mode (step S104). The control unit 231 refers to the driving mode management table 100 and acquires the combination of automatic control parameters associated with the driving mode. The control unit 231 executes driving in automatic control mode based on the automatic control parameters.

The control unit 231 then ends driving in automatic control mode (step S105). The control unit 231 ends driving in automatic control mode when the vehicle 10 has reached the destination location, when the vehicle 10 is to enter into a region where automatic control mode is not permitted, when the driver 40 has requested a change of control mode, or when it has been determined that the vehicle 10 cannot be safely driven in automatic control mode.

The acquisition unit 232 then acquires a response from the driver in regard to driving of the vehicle 10, as a numerical value (step S106). For example, when the acquisition unit 232 has ended driving in automatic control mode, the acquisition unit 232 displays a query regarding driving of the vehicle 10 on the display device 6a of the UI 6.

When the vehicle 10 has reached the destination location, the acquisition unit 232 preferably acquires a response from the driver after the vehicle 10 has stopped. When the vehicle 10 is to enter into a region where automatic control mode is not permitted, the acquisition unit 232 preferably acquires the response from the driver before the vehicle 10 enters into the region where automatic control mode is not permitted. When the driver 40 has requested a change in control mode, the acquisition unit 232 preferably acquires the response from the driver before the control mode is changed to manual control mode. When it has been determined that the vehicle 10 cannot be safely driven in automatic control mode, the acquisition unit 232 preferably acquires the response from the driver at a point when the vehicle 10 has stopped after the control mode has been changed to manual control mode.

In the example shown in FIG. 1, the display device 6a displays the text: "Please input the value that most closely matched your level of comfort with self-driving". The display device 6a displays that a level of 5 is to be input for "very relaxed", a level of 4 is to be input for "quite relaxed", a level of 3 is to be input for "relaxed", a level of 2 is to be input for "not very relaxed", a level of 1 is to be input for "motion sickness", and a level of 0 is to be input for "very uncomfortable".

The driver 40 operates the UI 6 to select a numerical value as the driver 40 response in regard to driving of the vehicle 10. For example, the driver 40 touches a region where the value of the response is displayed on the screen of the display device 6a. The acquisition unit 232 acquires the response from the driver 40 in regard to driving of the vehicle 10 based on the operation signal produced based on that region of the screen of the display device 6a.

The changing unit 233 then changes the automatic control parameters based on the numerical value of the response from the driver 40 acquired by the acquisition unit 232 (step S107), and the series of processing steps is complete. The changing unit 233 refers to the driving mode management table 100 and selects the driving mode represented by the combination of changed automatic control parameters. The changing unit 233 registers the selected driving mode in the driver management information in association with the driver identification information. In subsequent driving in automatic control mode, the control unit 231 selects the driving mode established by the changed automatic control parameters, to control the vehicle 10. The details regarding processing in step S107 will be described below.

When driving in automatic control mode is not to be initiated (step S103—No), on the other hand, the control unit

231 inputs the driving mode of the vehicle 10 in manual control mode, via the UI 6 (step S108). The control unit 231 displays information representing eco-mode, comfort mode and sports mode, for example, on the display device 6a of the UI 6. The control unit 231 inputs information representing the driving mode selected by the driver 40, via the UI 6.

The control unit 231 then initiates control of operation of the vehicle 10 in the driving mode selected by the driver 40, for manual control mode (step S109). The vehicle 10 is driven primarily by the driver 40.

The control unit 231 then ends driving in manual control mode (step S110), and the series of processing steps is complete. When the vehicle 10 has reached the destination location, or when a change in control mode has been requested by the driver 40, the control unit 231 ends driving by manual control mode.

Processing for changing of automatic control parameters by the changing unit 233 based on the numerical value of the response by the driver 40 will now be explained with reference to FIG. 3.

The changing unit 233 has a classifier trained to classify combinations of automatic control parameters changed from a current combination of automatic control parameters, by input of numerical values of responses from the driver 40. The classifier may use a deep neural network (DNN) pre-trained so as to output information for a combination of changed automatic control parameters, from the input numerical value for the response from the driver 40 and information for the current combination of automatic control parameters. The classifier is trained so as to output information for a combination of automatic control parameters in association with a driving mode in a group of modes with the same air conditioning control information among the input current combination of automatic control parameters.

For example, in the example shown in the driving mode management table 100 in FIG. 3, the current driving mode selected for the driver 40 was driving mode 1. When driving of the vehicle 10 in automatic control mode has ended, the numerical value of the response from the driver 40 may be level 1, indicating a perception of high acceleration and high braking of the vehicle 10.

In this case, the changing unit 233 inputs to the classifier the input numerical value of the response from the driver 40 (1) and the information for the current combination of automatic control parameters for driving mode 1. Since driving mode 1 is in a group of modes whose air conditioning control information among the automatic control parameters is "comfort", the classifier outputs information for the combination of automatic control parameters associated with one of the driving modes (driving mode 1 to 4) in the group of modes with "comfort" air conditioning control information. For example, the classifier outputs information for the combination of automatic control parameters represented by driving mode 2.

The changing unit 233 registers driving mode 2 in the driver management information which is stored in the memory 22, in association with the driver identification information representing the driver 40.

For example, in the example shown in the driving mode management table 100 in FIG. 3, the current driving mode selected for the driver 40 was driving mode 6. Alternatively, when driving of the vehicle 10 in automatic control mode has ended, the numerical value of the response from the driver 40 could be level 2, indicating a perception of low acceleration of the vehicle 10 and therefore a longer time required for the vehicle 10 to reach the destination location.

In this case, the changing unit 233 inputs to the classifier the input numerical value of the response from the driver 40 (2) and the information for the current combination of automatic control parameters for driving mode 6. Since driving mode 6 is in a group of modes whose air conditioning control information of the automatic control parameters is "eco", the classifier outputs information for the combination of automatic control parameters associated with one of the driving modes (driving modes 5 to 8) in the group of modes with "eco" air conditioning control information. For example, the classifier outputs information for the combination of automatic control parameters represented by driving mode 7.

The changing unit 233 registers driving mode 7 in the driver management information which is stored in the memory 22, in association with the driver identification information representing the driver 40.

The changing unit 233 may also change the automatic control parameters based on score information registered in the driving mode management table 100, without using a classifier.

The changing unit 233 selects a combination of automatic control parameters associated with one of the driving modes (driving modes 1 to 4) in a group of modes with the same air conditioning control information, based on both the score information for the current driving mode and the numerical value of the response from the driver 40.

For example, in the example shown in the driving mode management table 100 in FIG. 3, the current driving mode selected for the driver 40 was driving mode 1. When driving of the vehicle 10 in automatic control mode has ended, the numerical value of the response from the driver 40 may be level 1, indicating a perception of high acceleration and high braking of the vehicle 10.

Based on the score information 1 for the current driving mode 1 and the numerical value 1 for the response from the driver 40, the changing unit 233 changes the automatic control parameters to information for automatic control parameters representing driving mode 2, wherein the score information for the combination of automatic control parameters is a level of 2 which is one higher than the current driving mode 1.

For example, in the example shown in the driving mode management table 100 in FIG. 3, the current driving mode selected for the driver 40 was driving mode 6. Alternatively, when driving of the vehicle 10 in automatic control mode has ended, the numerical value of the response from the driver 40 could be level 2, indicating a perception of low acceleration of the vehicle 10 and therefore a longer time required for the vehicle 10 to reach the destination location.

Based on the score information 2 for the current driving mode 6 and the numerical value 2 for the response from driver 40, the changing unit 233 changes the automatic control parameters to information for automatic control parameters representing driving mode 7, wherein the score information for the combination of automatic control parameters is a level of 3 which is one higher than the current driving mode 6.

The changing unit 233 may also function so as to change the automatic control parameters when the numerical value of the response from the driver 40 is at or below a predetermined reference value (such as 3), and to not change the automatic control parameters when the numerical value of the response from the driver 40 is above the predetermined reference value.

Based on the difference between the numerical value of the response from the driver 40 and the numerical value representing the state of maximum relaxation (such as 5), the changing unit 233 may change the automatic control parameters to information of a combination of automatic control parameters representing a driving mode with higher score information than the current driving mode.

Since the acquisition unit 232 acquires the response from the driver as a numerical value in regard to current self-driving of the vehicle 10, the difference between driving which allows maximum relaxation and the current state of self-driving of the vehicle 10 can be represented as a numerical value, based on the response from the driver.

The changing unit 233 can decide the driving mode which allows the driver to be relaxed, by changing the automatic control parameters based on the difference between driving according to each individual driver preference (5) and the current state of self-driving of the vehicle 10.

As explained above, in the vehicle control device of this embodiment, automatic control parameters for driving of the vehicle are changed based on a response from the driver in regard to self-driving of the vehicle, represented as a numerical value. Since driving of the vehicle is automatically controlled based on the driving mode decided by the changed automatic control parameters, the vehicle control device allows driving of the vehicle to be carried out in a driving mode matching each individual driver preference.

Modified Example 1 and Modified Example 2 of the vehicle control device of this embodiment will now be described with reference to FIG. 5 to FIG. 8.

In Modified Example 1, the changing unit 233 changes the automatic control parameters based on the numerical value of the response from the driver 40 and information relating to the surrounding environment of the vehicle 10.

FIG. 5 is a diagram illustrating an example of a driving mode management table for the vehicle control device of Modified Example 1. In the driving mode management table 200, the driving modes for self-driving, the automatic control parameters and environment parameters are registered in an associated manner.

In the example of the driving mode management table 200 shown in FIG. 5, the automatic control parameters include longitudinal acceleration control information, lateral acceleration control information and damping control information. The environment parameters include road surface information, traffic information and road information. The road surface information, traffic information and road information are examples of information relating to the surrounding environment of the vehicle 10.

The road surface information indicates whether the surface of the road on which the vehicle 10 is traveling is dry or wet. The traffic information indicates whether the road on which the vehicle 10 is traveling is congested or not congested. The road information indicates the type of road on which the vehicle 10 is traveling (for example, high-speed road, general road or mountain road).

The driving mode management table 200 has a mode column 201 in which driving modes for self-driving are registered, a longitudinal acceleration column 202 in which longitudinal acceleration control information is registered, a lateral acceleration column 203 in which lateral acceleration control information is registered, a damping column 204 in which damping control information is registered, a road surface column 205 in which road surface information is registered, a traffic column 206 in which traffic information is registered, and a road column 207 in which road information is registered. One driving mode is determined by association between a combination of the different automatic control parameters (longitudinal acceleration control information, lateral acceleration control information and damping control information), and a combination of the environment parameters (road surface information, traffic information and road information).

In the vehicle control processing shown in FIG. 4 for Modified Example 1 for the vehicle control device, environment parameter calculation processing (step S111) is carried out between step S101 and step S102.

FIG. 6 is an example of an operation flow chart for environment parameter calculation processing by the vehicle control device of this embodiment.

First, the calculating unit 234 calculates the road surface information (step S201). During the period from activation of the vehicle control device 11 until the current time, the calculating unit 234 identifies whether the road surface of the road on which the vehicle 10 is traveling is dry or wet, based on multiple front images taken by the front camera 2.

The calculating unit 234 has a classifier trained to classify whether the road surface of the road represented in input images is dry or wet. The classifier used may be a deep neural network (DNN) that has been pretrained to detect whether a road surface is dry or wet based on input images in which the surface of the road is represented.

The front images used for identification of the road surface information may be all of the images taken during the period from startup of the vehicle control device 11 until the current time, or they may be only some of the images taken.

The calculating unit 234 detects whether the road surface is dry or wet using the classifier, for each of multiple front images. The calculating unit 234 calculates the road surface information based on the most prevalent detection results. The road surface information indicates either a dry or wet condition.

The calculating unit 234 then calculates the traffic information (step S202). The calculating unit 234 acquires traffic information for the scheduled route of the vehicle 10 from a server connected to the communication network, via a wireless communication device (not shown). The traffic information includes information representing the average speed for the roads included in the scheduled route of the vehicle 10. The calculating unit 234 calculates the average speed for when the vehicle 10 has traveled on the scheduled route. The calculating unit 234 determines that the road is congested if the average speed is at or below a predetermined reference speed, and determines that the road is not congested if the average speed is above the reference speed. The traffic information represents a congested or not congested state.

The calculating unit 234 then calculates the road information (step S203), and the series of processing steps is complete. Based on map information stored in the memory 22, the calculating unit 234 acquires the types of roads on which the vehicle 10 is expected to travel from the current location of the vehicle 10 to the destination location, based on the scheduled route for the vehicle 10.

Based on the scheduled route, the calculating unit 234 calculates the distance for traveling of the vehicle 10 on each type of road, and decides the type of road with the longest traveling distance, as road information. The types of roads may be high-speed roads, general roads and mountain roads.

In step S102 of the vehicle information processing shown in FIG. 4 for this modified example, the control unit 231 refers to the combination of environment parameters calculated in step S111 and the driver management information stored in the memory 22, and acquires the driving mode which is associated with the same combination of environment parameters as those environment parameters, and which was previously selected.

In step S107 of the vehicle information processing shown in FIG. 4, the changing unit 233 selects a changed combination of automatic control parameters, from among driving modes in the same mode group as the combination of environment parameters calculated in step S111, based on the numerical value of the response from the driver 40 acquired by the acquisition unit 232.

For example, in the example shown in the driving mode management table 200 in FIG. 5, the current driving mode selected for the driver 40 was driving mode 9. When driving of the vehicle 10 in automatic control mode has ended, the numerical value of the response from the driver 40 may be level 1, indicating a perception of high acceleration and high braking of the vehicle 10.

In this case, the changing unit 233 inputs to the classifier the input numerical value of the response from the driver 40 (1) and the information for the current combination of automatic control parameters for driving mode 9. Since driving mode 9 is in a group where the environment parameters are road surface information: dry, traffic information: congested, road information: high-speed road, the classifier outputs information for the combination of changed automatic control parameters from among driving modes 9 to 11 which are a group of modes with the same environment parameters. For example, the classifier outputs information for the combination of automatic control parameters represented by driving mode 10.

The changing unit 233 registers driving mode 10 in the driver management information which is stored in the memory 22, in association with the driver identification information representing the driver 40. This concludes the explanation of Modified Example 1.

As explained above, the vehicle control device according to this modified example changes automatic control parameters for driver preference in association with information relating to the surrounding environment of the vehicle. The surrounding environment of the vehicle will not necessarily be the same each time the vehicle is driven. With the vehicle control device of this embodiment, automatic control parameters for driving of the vehicle are changed based on the surrounding environment of the vehicle and a response from the driver in regard to self-driving of the vehicle, represented as a numerical value. Since driving of the vehicle is automatically controlled by the vehicle control device based on the driving mode decided by the changed automatic control parameters, the vehicle can be driven in a driving mode matching each individual driver preference in context of the surrounding environment of the vehicle.

A vehicle control device 11 according to Modified Example 2 will now be described. In Modified Example 2, the changing unit 233 changes the automatic control parameters based on the numerical value of the response from the driver 40 and information relating to the state of the driver 40.

FIG. 7 is a diagram illustrating an example of a driving mode management table for the vehicle control device of Modified Example 2. In the driving mode management table 300, the driving modes for self-driving, the automatic control parameters and the driver parameters are registered in an associated manner.

In the example of the driving mode management table 300 shown in FIG. 7, the automatic control parameters include longitudinal acceleration control information, lateral acceleration control information and damping control information. The driver parameters include alertness level information and facial expression information. The alertness level information and facial expression information are examples of information relating to the state of the driver 40.

The alertness level information indicates a high or low level of alertness of the driver 40. The facial expression information indicates comfortable or uncomfortable emotion of the driver.

The driving mode management table 300 has a mode column 301 in which driving modes for self-driving are registered, a longitudinal acceleration column 302 in which longitudinal acceleration control information is registered, a lateral acceleration column 303 in which lateral acceleration control information is registered, a damping column 304 in which damping control information is registered, an alertness level column 305 in which alertness level information is registered, and a facial expression column 306 in which facial expression information is registered. One driving mode is determined by association between a combination of the different automatic control parameters (longitudinal acceleration control information, lateral acceleration control information and damping control information), and a combination of the driver parameters (alertness level information and facial expression information).

In the vehicle control processing shown in FIG. 4 for Modified Example 2 for the vehicle control device, driver parameter calculation processing (step S111) is carried out between step S101 and step S102.

FIG. 8 is an example of an operation flow chart for driver parameter calculation processing by the vehicle control device of this embodiment.

First, the calculating unit 234 calculates the alertness level information (step S301). The calculating unit 234 estimates the alertness level of the driver 40 during the period from startup of the vehicle control device 11 until the current time, based on multiple facial images taken by the monitoring camera 3.

The calculating unit 234 has a classifier trained to classify the alertness level of the driver 40 represented in input images. The classifier may use a deep neural network (DNN) that has been pretrained to detect alertness levels from faces depicted in input images. The classifier outputs an alertness level as a positive real number between 0 and 1.0, for example.

The calculating unit 234 estimates that the alertness level of the driver 40 is high when the average value of the alertness level output from the classifier is at or above a predetermined reference value (such as 0.7), and estimates that the alertness level of the driver 40 is low when the average value is below the predetermined reference value. The alertness level information indicates either a high or low level.

The facial images used for identification of the alertness level may be all of the images taken during the period from startup of the vehicle control device 11 until the current time, or they may be only some of the images taken.

The calculating unit 234 then calculates the facial expression information (step S202), and the series of processing steps is complete. The calculating unit 234 estimates the facial expression of the driver 40 during the period from startup of the vehicle control device 11 until the current time, based on multiple facial images taken by the monitoring camera 3.

The calculating unit 234 has a classifier trained to classify the facial expression of the driver 40 represented in input images. The classifier may use a deep neural network (DNN) that has been pretrained to detect facial expression information from faces depicted in input images. The classifier detects the facial expression information as "comfortable" or "uncomfortable".

The facial images used for identification of the facial expression information may be all of the images taken during the period from startup of the vehicle control device 11 until the current time, or they may be only some of the images taken.

The calculating unit 234 calculates the facial expression information of the driver 40 based on the most prevalent facial expression information output from the classifier. The facial expression information is represented as "comfortable" or "uncomfortable".

In step S102 of the vehicle information processing shown in FIG. 4 for this modified example, the control unit 231 refers to the combination of driver parameters calculated in step S111 and the driver management information stored in the memory 22, and acquires the driving mode which is associated with the same combination of driver parameters as those driver parameters, and which was previously selected.

In step S107 of the vehicle information processing shown in FIG. 4, the changing unit 233 selects a changed combination of automatic control parameters, from among the driving modes in the same mode group as the combination of driver parameters calculated in step S111, based on the numerical value of the response from the driver 40 acquired by the acquisition unit 232.

For example, in the example shown in the driving mode management table 300 in FIG. 7, the current driving mode selected for the driver 40 was driving mode 15. Alternatively, when driving of the vehicle 10 in automatic control mode has ended, the numerical value of the response from the driver 40 could be level 1, indicating a perception of high acceleration and high braking of the vehicle 10.

In this case, the changing unit 233 inputs to the classifier the input numerical value of the response from the driver 40 (1) and the information for the current combination of automatic control parameters for driving mode 15. Since driving mode 15 is in a group where the driver parameters are alertness level information: high, facial expression information: comfortable, the classifier outputs information for the combination of changed automatic control parameters from among driving modes 15 to 17 which are groups with the same driver parameters. For example, the classifier outputs information for the combination of automatic control parameters represented by driving mode 16.

The changing unit 233 registers driving mode 16 in the driver management information which is stored in the memory 22, in association with the driver identification information representing the driver 40. This concludes the explanation of Modified Example 2.

As explained above, the vehicle control device according to this modified example changes automatic control parameters for driver preference in association with information relating to the state of the driver. The state of the driver will not necessarily be the same each time the vehicle 10 is driven. With the vehicle control device of this embodiment, automatic control parameters for driving of the vehicle are changed based on the state of the driver and a response from the driver in regard to self-driving of the vehicle, represented as a numerical value. Since driving of the vehicle is automatically controlled by the vehicle control device based on the driving mode decided by the changed automatic control parameters, the vehicle can be driven in a driving mode matching each individual driver preference in context of the state of the driver.

The vehicle control device, the computer program for vehicle control and the method for controlling a vehicle according to the embodiments described above may incorporate appropriate modifications that are still within the gist of the disclosure. Moreover, the technical scope of the disclosure is not limited to these embodiments, and includes the invention and its equivalents as laid out in the Claims.

For example, in the embodiment described above, the acquisition unit, changing unit and calculating unit were implemented in the vehicle, but the acquisition unit, changing unit and calculating unit may also be implemented in a server connected in a communicable manner with the vehicle. In this case, the vehicle first sends the driver identification information to the server. When the vehicle begins to drive in automatic control mode, the server sends the driving mode associated with the driver identification information to the vehicle. When the vehicle ends driving in automatic control mode, the vehicle sends the response from the driver in regard to driving of the vehicle to the server. The server changes automatic control parameters based on the received numerical value of the response from the driver.

Also in the embodiment described above, the acquisition unit acquired a response from the driver as a numerical value for the level of relaxation in regard to driving of the vehicle, but there is no limitation to this type of response so long as the response from the driver relates to driving of the vehicle in automatic control. For example, the acquisition unit may acquire a response from the driver in regard to the degree of impression, or the degree of safety perceived, or the degree of danger perceived in regard to driving of the vehicle, as a numerical value. In the embodiment described above, the vehicle control device obtained input of the response from the driver by driver operation of a region displaying number levels on a screen in the display device. However, the method of inputting the response from the driver is not limited to this one. For example, the method of responding with a numerical value by the driver may be input by manual operation of a switch or touch panel, or it may employ a line of sight switch in which the response from the driver is input by blinking in tandem with the line of sight of the driver on a numerical value displayed in a HUD.

Moreover, in the embodiment described above, the driving mode associated with the combination of automatic control parameters was changed based on the numerical value of the response from the driver, but the information including the automatic control parameters may also be changed based on the numerical values of the response from the driver, without using driving modes. In this case, one driving mode is established by a combination of changed automatic control parameters. The response from the driver may also be digitized based on images of the driver's face. For example, the emotion of the driver may be estimated based on images of the driver's face. The number of times that comfort and/or discomfort are expressed by the driver while the vehicle is traveling may be counted, for example, as the numerical value for the emotion of the driver. The numerical value used may also be a real number instead of an integer.

The changing unit of the embodiment described above may also change the automatic control parameters based on the numerical value of the response from the driver acquired by the acquisition unit, on information relating to the surrounding environment of the vehicle, and on information relating to the state of the driver.

The invention claimed is:

1. A vehicle control device for a vehicle in which driving is automatically controlled in a predetermined driving mode established by automatic control parameters associated with a driver of the vehicle, the vehicle control device comprising:

a processor configured to acquire a response from the driver in regard to driving of the vehicle, as a numerical value, when driving of the vehicle by automatic control has ended, and change the automatic control parameters associated with the driver based on the numerical value of the response from the driver;

wherein, prior to initiating self-driving, the processor identifies the driver, refers to driver management information stored in a memory to acquire the predetermined driving mode associated with the identified driver, and initiates automatic control of the vehicle in the acquired driving mode associated with the driver; and wherein the automatic control parameters comprise information for controlling damping of vibration by a suspension system of the vehicle.

2. The vehicle control device according to claim 1, wherein the processor is further configured to acquire the response from the driver as the numerical value for the level of relaxation in regard to driving of the vehicle.

3. The vehicle control device according to claim 1, wherein the processor is further rconfigured to change the automatic control parameters based on the numerical value of the response from the driver, and on information relating to surrounding environment of the vehicle.

4. The vehicle control device according to claim 1, wherein the processor is further configured to change the automatic control parameters based on the numerical value of the response from the driver, and on information relating to a state of the driver.

5. The vehicle control device of claim 1 wherein the automatic control parameters further comprise acceleration of the vehicle in a longitudinal direction, and acceleration of the vehicle in a lateral direction.

6. The vehicle control device of claim 1 wherein the automatic control parameters further comprise an air-conditioning setting of an air-conditioning system of the vehicle.

7. A computer-readable, non-transitory storage medium storing a computer program for vehicle control in a vehicle in which driving is automatically controlled in a predetermined driving mode established by automatic control parameters associated with a driver of the vehicle, which causes a processor to execute a process, the process comprising:

acquiring a response from the driver in regard to driving of the vehicle, as a numerical value, when driving of the vehicle by automatic control has ended; and changing the automatic control parameters associated with the driver based on the numerical value of the response from the driver;

wherein the process comprises, prior to initiating self-driving, identifying the driver, referring to driver management information stored in a memory to acquire the predetermined driving mode associated with the identified driver, and initiating automatic control of the vehicle in the acquired driving mode associated with the driver; and wherein the automatic control parameters comprise information for controlling damping of vibration by a suspension system of the vehicle.

8. A method for controlling a vehicle in which driving is automatically controlled in a predetermined driving mode established by automatic control parameters associated with a driver of the vehicle, carried out by a vehicle control device and the method comprising:

acquiring a response from the driver in regard to driving of the vehicle, as a numerical value, when driving of the vehicle by automatic control has ended; and changing the automatic control parameters associated with the driver based on the numerical value of the response from the driver;

wherein the method comprises, prior to initiating self-driving, identifying the driver, referring to driver management information stored in a memory to acquire the predetermined driving mode associated with the identified driver, and initiating automatic control of the vehicle in the acquired driving mode associated with the driver; and wherein the automatic control parameters comprise information for controlling damping of vibration by a suspension system of the vehicle.

\* \* \* \* \*